2 Sheets—Sheet 1.
J. M. DODGE.
Assignor to The Dodge Coal Storage Company.
MACHINERY FOR HANDLING COAL.
No. 11,258. Reissued Aug. 9, 1892.
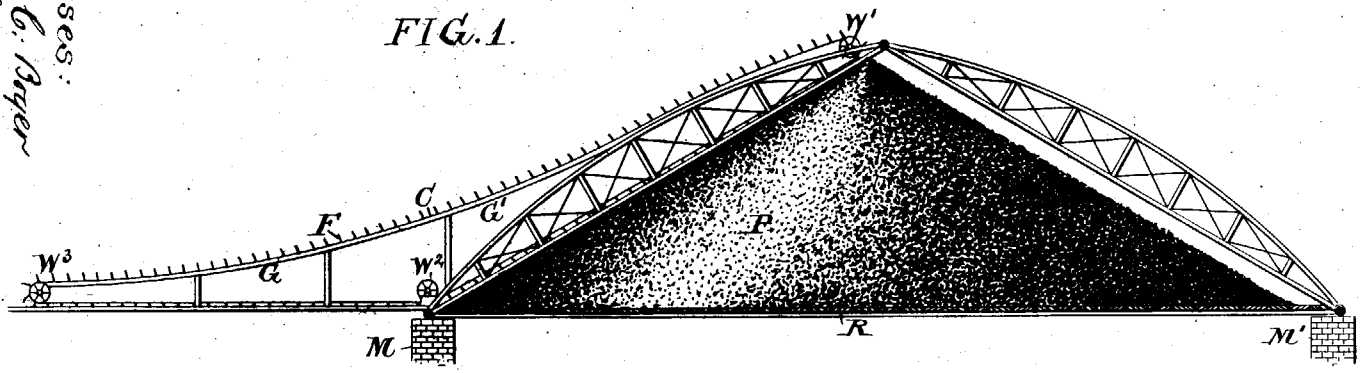
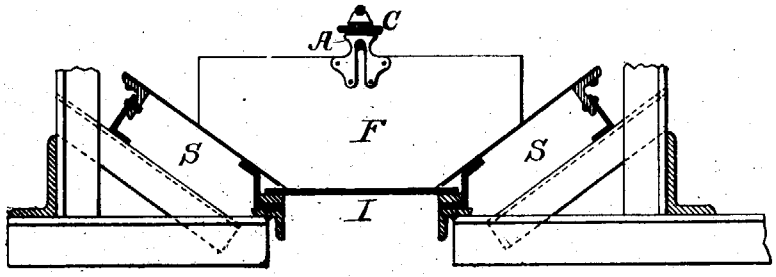
Witnesses:
Murray C. Boyer
A. V. Groupe
Inventor:
James M. Dodge
by his Attorneys
Howson & Howson

J. M. DODGE.
Assignor to The Dodge Coal Storage Company.
MACHINERY FOR HANDLING COAL.
No. 11,258. Reissued Aug. 9, 1892.
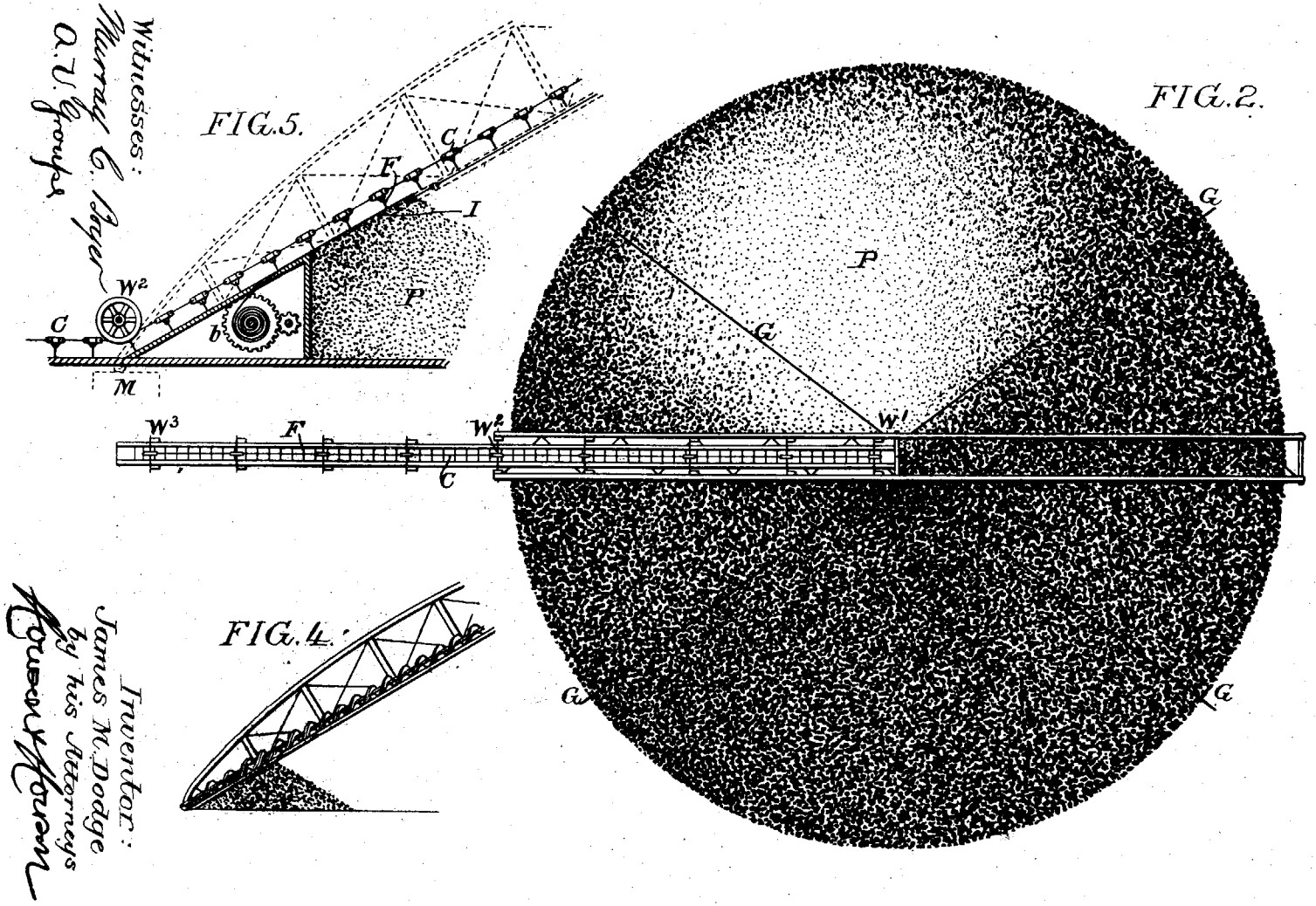
Witnesses:
Murray C. Boyer
A. V. Groupe
Inventor:
James M. Dodge
by his Attorneys
Howson & Howson

UNITED STATES PATENT OFFICE.

JAMES M. DODGE, OF PHILADELPHIA, PENNSYLVANIA, ASSIGNOR TO THE DODGE COAL STORAGE COMPANY, OF NAUGATUCK, CONNECTICUT.

MACHINERY FOR HANDLING COAL.

SPECIFICATION forming part of Reissued Letters Patent No. 11,258, dated August 9, 1892.

Original No. 446,814, dated February 17, 1891. Application for reissue filed February 2, 1892. Serial No. 420,125.

*To all whom it may concern:*

Be it known that I, JAMES M. DODGE, a citizen of the United States, and a resident of Philadelphia, Pennsylvania, have invented certain Improvements in Machinery for Handling Coal, of which the following is a specification.

My invention consists of improvements in the construction of ways or supports for conveying machinery used in piling coal or analogous material for storage purposes. Heretofore in this class of work two general plans have been adopted, the first being the erection of long and substantially horizontal ways, from which are suspended large buckets that are moved back and forth, receiving and discharging loads of coal intermittently, such ways being supported by upright framework or posts, which remain buried in the coal to a greater or less extent for a long period, said supports being thus subjected to the deteriorating action of moisture, sulphur, &c., and interfering with the free use of devices for reloading the coal for shipment. The other plan is that which I have shown in several of my coal-handling devices patented within the past few years, and which consists, mainly, in the use of an endless conveyer chain or rope provided with laterally-projecting flights or scrapers adapted to feed coal regularly and continuously to the storage pile, the mechanism being supported by a pole or a mast and boom.

By the operation of this device a substantially conical pile is formed.

A pole support is open to the objections noted above, and a boom overcomes the difficulties only in the case of small piles, as it must be inclined at an angle with the horizontal not greater than the angle of repose of the material to be piled, and cannot practically be made long enough and strong enough to span half of a large pile. Furthermore, in coal-piling outfits using a suspended chain and flights it is often desirable to employ intervening plates to reduce the friction between the loaded flights or scrapers and the coal over which they travel, and as these plates are heavy and have to be carried over the yielding coal and must be readjusted in case the pile settles from any cause it is desirable to provide some convenient means of supporting an adjustable anti-friction plate or series of plates interposed between the flights or scrapers and the pile, besides rendering all parts of the machinery accessible for oiling, repairs, &c., and reducing the strain which would be exerted on the chain if the latter were suspended between wheels.

The object of my invention is to overcome the difficulties and secure the desirable features described above.

To enable those skilled in the art to which my improvement relates to understand and practice the same, I will now proceed to describe my invention more fully, referring to the accompanying drawings, in which—

Figure 1 is a side elevation of a coal-piling apparatus, illustrating my invention. Fig. 2 is a top view of the same. Fig. 3 is a detail view on a larger scale showing a cross-section of a portion of the truss structure and illustrating the relation of one of the flights or scrapers to the supporting-ways. Fig. 4 is a view illustrating a portion of a truss with another form of conveyer, and Fig. 5 is an enlarged longitudinal section of the conveyer and support shown in Fig. 1.

C is the conveyer chain or rope.

F F are flights or scrapers.

W′ is the head-wheel, or that around which the chain and flights pass at the upper end of the conveyer.

$W^2$ is a wheel at the bend or angle between the horizontal and inclined runs of the conveyer used to hold the chain down and prevent the draft strain from lifting it away from its work.

$W^3$ is the tail-wheel of the conveyer, around which the chain and flights pass at the receiving end.

P′ is the pile of coal.

M and M′ are masonry supports for the lower ends of a pair of trusses inclined in opposite directions at or about the angle of repose of the pile and connected at their upper or meeting ends, so as to constitute the legs of a sheers structure, G being the lateral guys to stay the sheers in an upright position, and R the rod or other connection between the feet of the sheers to prevent further spread.

In Fig. 3 the inclined ways or supports which carry the flights or scrapers are marked S, and the attachment block by means of which the flight is fastened to the chain is A.

The operation will be largely understood from the above description and a reference to the drawings. In the present instance the material is fed to the horizontal portion at any convenient point between $W^3$ and $W^2$, and after it leaves the level at $W^2$ it is carried up by the lower run of the conveyer and discharged onto the pile at its various stages of formation.

In handling coal which has large lumps and where the friction between the loaded flights or scrapers and the coal over which they travel would be excessive it is desirable to use an adjustable intervening plate (or series of plates) to overcome the friction, and the construction of the truss furnishes supports for such a plate and also for the conveyer-flights, as will be seen in Fig. 3, where the plate is represented at I, and is carried by ledges or angle-iron projections *a*, provided on the truss for the purpose. The form in which I prefer to make this plate and the means for adjusting it I have fully described in another application filed by me May 12, 1890, Serial No. 351,539. This plate may be briefly described as a steel ribbon or belt, which is, as shown in Fig. 5, wound around a drum *b* at or near the foot of the truss, along which the conveying machinery travels, and is arranged to be drawn up toward the upper end of the conveyer as the formation of the pile progresses, the ribbon being supported on the ledges *a* in the truss-framework, as described above, and adjustable lengthwise of the leg of the sheers, so as to form an advancing point of discharge to suit the requirements of the growing pile.

To make all parts accessible for oiling, repairs, &c., I attach to the side of the truss and about on a level with the conveying machinery a walk or stairway with a light hand-rail at the outside.

Of the two runs of chain and flights the lower or carrying run is sustained by the side supporting-ways S S, thus overcoming the strain which would result from the suspension of a long stretch of chain and flights between the upper and lower wheels. The space between the lower ends of the side plates S provides for the discharge of the coal when the latter has been carried up to the top of the adjustable bottom plate I or to the apex of the pile when said bottom plate is not used. The upper run of chain and flights is returned on guide-strips G′, as shown in Fig. 1, or on idlers placed near enough together to prevent the strain of such long stretches. The truss structure furnishes a support for these idlers when used, so that they do not require to be suspended by ropes or cables under great tension, as has been necessary heretofore.

In Fig. 1 I have shown my piling device as used in connection with a horizontal conveyer, and it is evident that the horizontal portion could be extended to any desired distance or dispensed with altogether without affecting my invention, and it is also plain that the driving power may be applied either at W′ or $W^3$, as the circumstances of the case may suggest. The sheer-legs are preferably provided with masonry supports, and the feet are preferably held from further separation by a tie-rod R or other connection running under the pile and insulated from the effects of moisture, sulphur, &c., in any well-known manner, and the two legs of the truss are hinged at the apex as a matter of convenience in construction and erection; but it is evident that various modifications of such details of arrangement may be adopted without departing from my invention.

I have shown my device as applied to the style of coal handling machinery which I have used most frequently—namely, that which employs an endless chain or cable provided with transverse flights or scrapers; but it is evident that I can use any other form of continuous conveyer—for instance, a screw conveyer, as shown in Fig. 4—supported at proper intervals by bearings suitably attached to the truss structure. The form illustrated in the drawings utilizes but one leg of the sheers; but if circumstances would make it desirable to use both legs this modified form would of course come within the spirit of my invention, and, if desired, the sheers may be composed of more than two legs.

I have not considered it necessary to illustrate the various uses which could be made of my device.

In the claims I use the words "continuous forward-feed conveyer" to distinguish the conveyer used by me from conveyers which carry a load to the pile and return for a new load before another load is discharged onto the pile—such, for instance, as a single bucket which reciprocates between the point of loading and the point of discharge or piling.

I claim as my invention—

1. In an apparatus for piling coal or analogous material, a sheer structure composed of legs arranged in respect to each other at or about the angle of repose of the material to be piled, and also arranged to span the pile to be formed, with a continuous forward-feed conveyer carried by said sheer structure and adapted to form the pile under the sheers, substantially as described.

2. In an apparatus for piling coal or analogous material, a stationary sheer structure composed of legs fixed in respect to each other at or about the angle of repose of the material to be piled, and also arranged to span the pile to be formed, masonry supports upon which the lower ends of the legs are fixed, and a continuous forward-feed conveyer carried by said sheer structure and adapted to form the pile under the sheers, substantially as described.

3. The combination of a sheer structure composed of members upwardly inclined toward each other and connected at the top, so as to form a mutual support and leave a free and unencumbered space between said members, and a continuous forward-feed conveyer supported throughout the length of its elevating portion by one of said members, the latter being open at the bottom to allow of the discharge of material from the elevating portion of the conveyer at advancing points beneath said supporting members, substantially as described.

4. The combination of the sheers composed of legs inclined at or about the natural angle of repose of the material to be piled and joined at their upper ends with a conveyer arranged to carry the material to be piled up one of said legs and means for connecting the lower parts of the legs together, substantially as set forth.

5. The combination of the sheers having legs inclined at or about the natural angle of repose of the material to be piled and joined at their upper ends, an inclined plane on one of said legs, and a continuous forward-feed conveyer for carrying the material on this inclined plane to a point of discharge, substantially as set forth.

In testimony whereof I have signed my name to this specification in the presence of two subscribing witnesses.

JAMES M. DODGE.

Witnesses:
JNO. E. PARKER,
ALBERT POPKINS.